Figure 10:
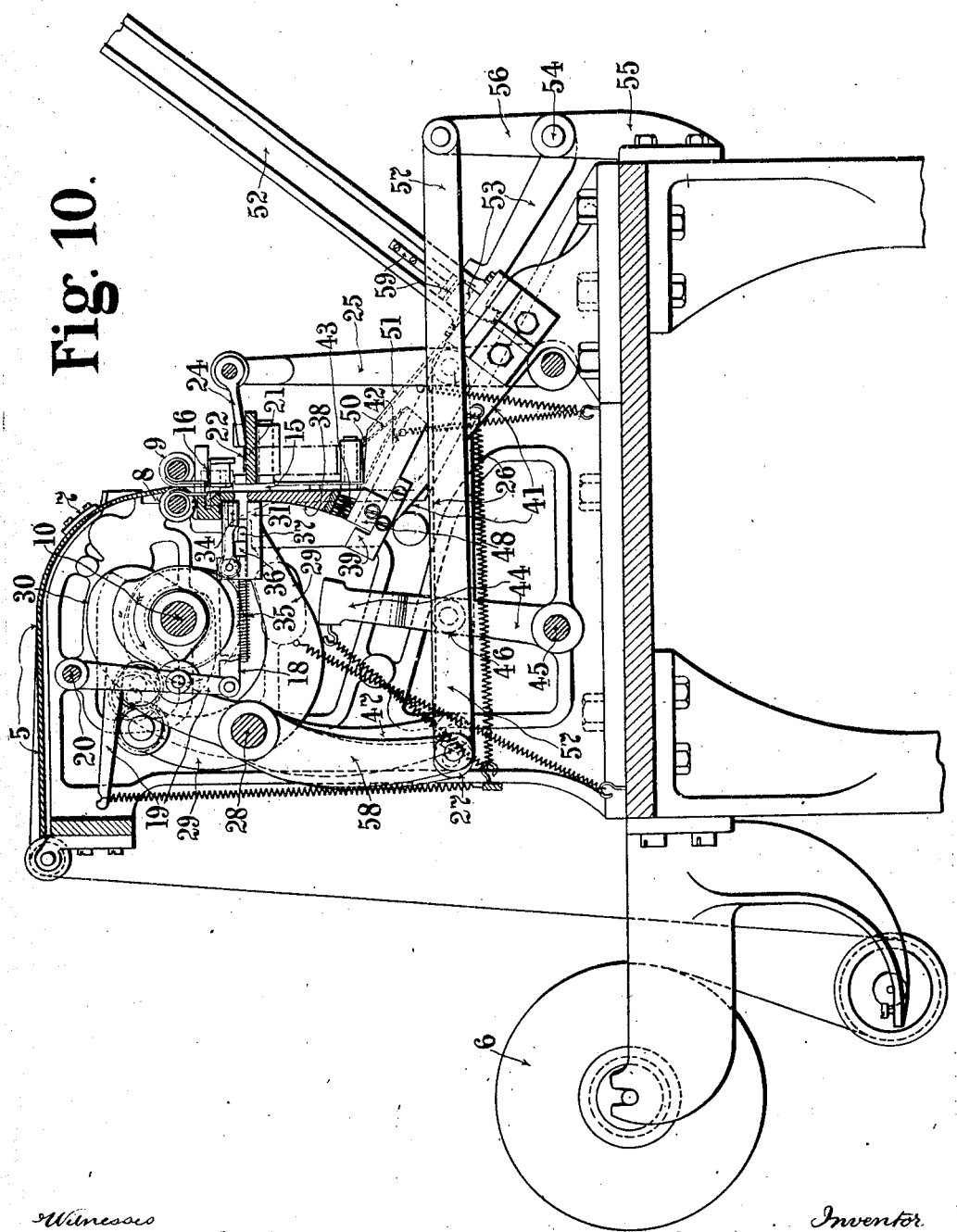

No. 860,539. PATENTED JULY 16, 1907.
F. GROVER.
MACHINE FOR FOLDING WRAPPERS AROUND RECTANGULAR TABLETS.
APPLICATION FILED APR. 20, 1907.
5 SHEETS—SHEET 1.
Fig. 1
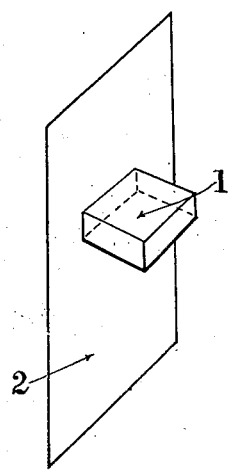
Fig. 2
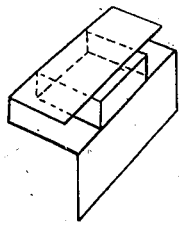
Fig. 3
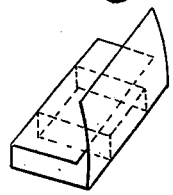
Fig. 4
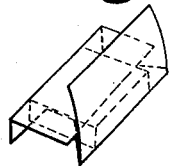
Fig. 5
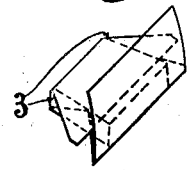
Fig. 6
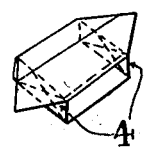
Fig. 7
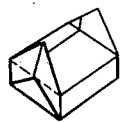
Fig. 8
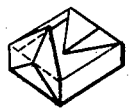
Fig. 9
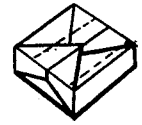
Witnesses
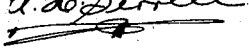
Inventor
Frederick Grover.
his atty.

No. 860,539. PATENTED JULY 16, 1907.
F. GROVER.
MACHINE FOR FOLDING WRAPPERS AROUND RECTANGULAR TABLETS.
APPLICATION FILED APR. 20, 1907.

5 SHEETS—SHEET 3.

Witnesses
Chas H Smith
A. H. Serrell

Inventor
Frederick Grover
by Harold Serrell
his atty.

No. 860,539.

PATENTED JULY 16, 1907.

F. GROVER.
MACHINE FOR FOLDING WRAPPERS AROUND RECTANGULAR TABLETS.
APPLICATION FILED APR. 20, 1907.

5 SHEETS—SHEET 4.

Witnesses
Chas. H. Smith
A. H. Serrell

Inventor
Frederick Grover
per Harold Serrell
his atty.

No. 860,539. PATENTED JULY 16, 1907.
F. GROVER.
MACHINE FOR FOLDING WRAPPERS AROUND RECTANGULAR TABLETS.
APPLICATION FILED APR. 20, 1907.
5 SHEETS—SHEET 5.
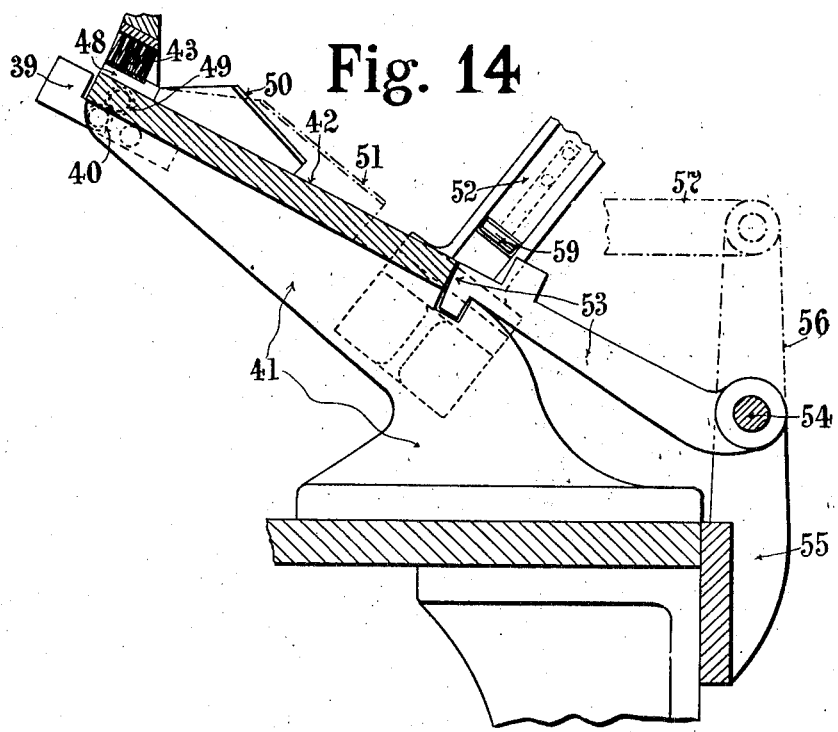
Fig. 14
Fig. 15
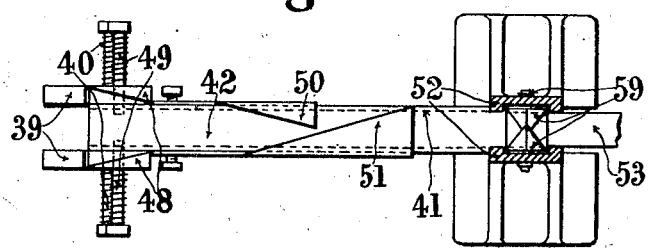
Witnesses
Chas H Smith
A H Derrell
Inventor
Frederick Grover
per Harold Sarell
his atty

UNITED STATES PATENT OFFICE.

FREDERICK GROVER, OF LEEDS, ENGLAND, ASSIGNOR TO THE FORGROVE MACHINERY COMPANY LIMITED, OF LEEDS, ENGLAND.

MACHINE FOR FOLDING WRAPPERS AROUND RECTANGULAR TABLETS.

No. 860,539.  Specification of Letters Patent.  Patented July 16, 1907.

Application filed April 20, 1907. Serial No. 369,209.

*To all whom it may concern:*

Be it known that I, FREDERICK GROVER, a subject of the King of Great Britain, residing at Leeds, in the county of York, England, have invented certain new and useful Improvements in Machines for Folding Wrappers Around Rectangular Tablets, and of which the following is a specification.

I have heretofore described a machine for folding a wrapper around rectangular tablets, such for instance as cakes of chocolate, and gumming one edge of the wrapper to secure it in position, all effected automatically in the same machine. In this known machine, the wrapper, composed say of paper, was exactly equal in width to the width of the tablets, and therefore did not project over the ends; in such a machine a strip of the wrapping material of the correct width was laid upon a sloping table, which latter was slid forwards and so delivered one end of the wrapper in between two rollers, by the motion of which a proper length of the wrapper was inserted into a pocket and then cut off by a knife; and then the tablet to be wrapped was moved, by a pusher through a slot in the pocket in a plane at right angles to the plane of the wrapper. The tablet, carrying the wrapper with it, was then received by a gripper device, by which the wrapper was folded around the under surface of the tablet, one edge, and part of the upper surface; then the gripper was carried downwards with its forward edge adjacent to a curved plate, so folding the projecting portion of the wrapper upwards and covering the opposite edge of the tablet; then the tablet was ejected from the gripper, between a sloping surface and a brush located at a distance above the said sloping surface, by which the upstanding end of the wrapper was folded over the tablet, it having previously been gummed. Thus the wrapper was caused to inclose the tablet excepting the ends thereof. I have also heretofore described a machine, of the type above referred to but of a modified construction, for folding a wrapper around rectangular tablets automatically. In this known machine, the tablet was covered on its sides and under and upper surfaces and also at its ends; the wrapper, say composed of metal foil, was made greater in width than the width of the tablet, and mechanism was provided by which the projecting edges of the wrapper were folded upon the ends of the tablet. In such a machine, the gripper was made with side tongues by which the first end fold of the wrapper was effected simultaneously with the wrapper and the tablet together being forced into the gripper device, side plates were provided in the sloping delivery plate by which the second fold was made in the ends of the wrapper, and slotted guides were formed in the sides of the sloping delivery plate by which the upper and lower portions of the wrapper at the ends were folded over, one upon another. Thus the wrapper was caused to just inclose the tablet.

Now the object of this present invention is to so alter and add to this class of machine that the tablet may be not merely inclosed, but also that it shall be more effectually covered at its ends and additionally covered on its upper surface, and with this object I provide a wrapper, say composed of paper, which is of a width over twice that of the tablet, and I provide mechanism by which the projecting edges of the wrapper are folded tightly upon the ends and then over upon the upper surface of the tablet. To effect this, I now make the sloping delivery plate with upstanding side tongues by which the projecting under portions of the wrapper are folded up against the ends of the tablet on the gripping device having carried the tablet and its wrapper downward below the curved plate, and then I provide side tongues on the gripper and also on the forward part of the sloping delivery plate by which the rear and forward end folds of the wrapper are made upon the tablet on the latter being ejected from the gripper between the sloping surface and the brush, and upstanding and inwardly turned blades are provided on the sloping delivery plate beyond the side tongues by which the folded ends of the wrapper are turned upward against the ends of the tablet and then over, one upon another, upon the upper surface of the tablet. Thus the tablet is effectually and securely inclosed in the wrapper.

Figure 11:
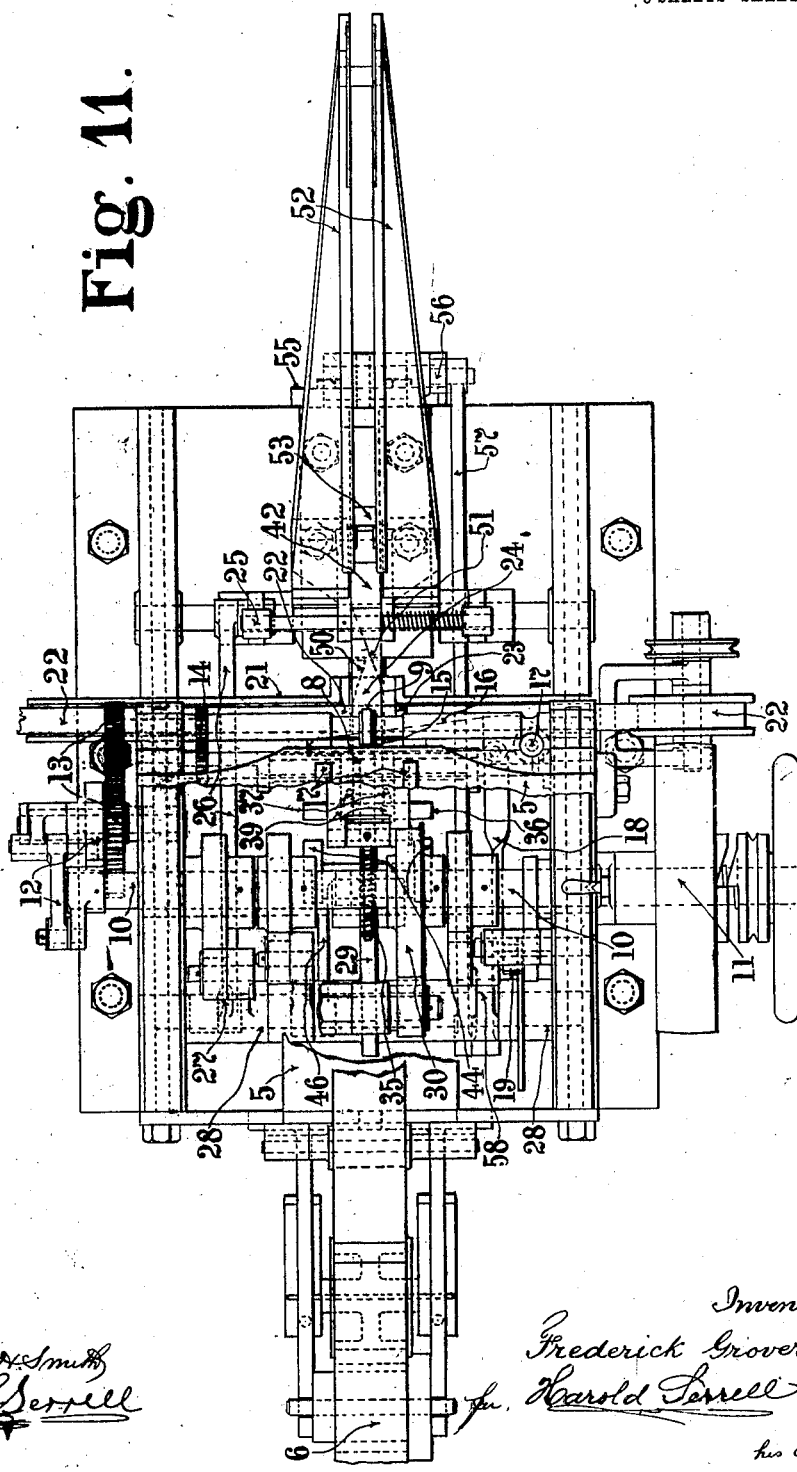
Figure 12:
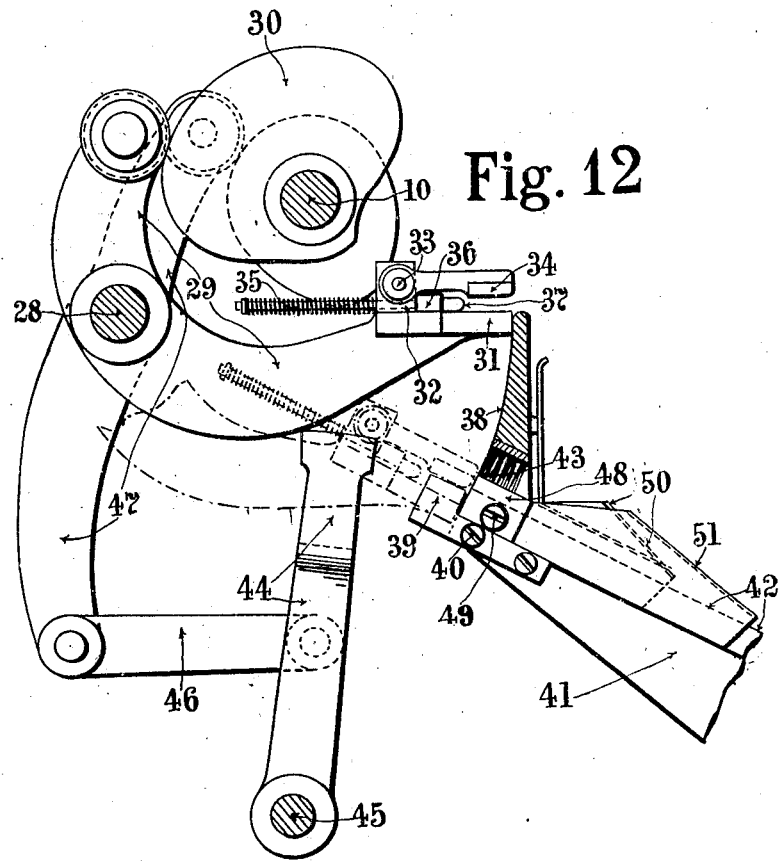
Figure 13:
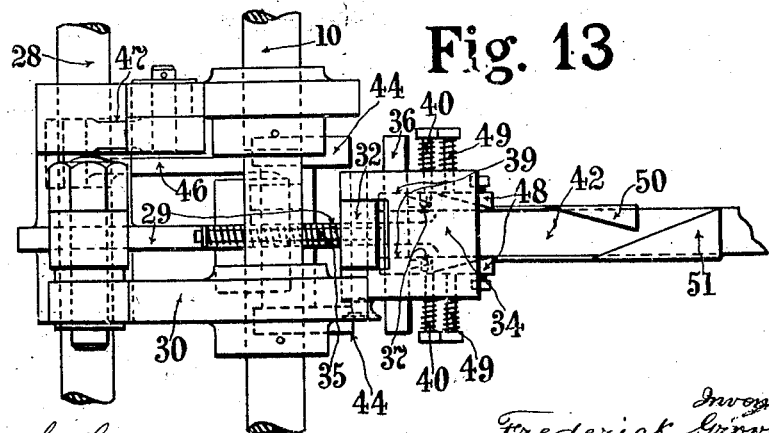

In the drawings at Figures 1 to 9 there are illustrated by perspective views the several stages in the wrapping of a tablet effected by the improved machine hereinafter described. At Fig. 1 the tablet 1 is shown in the position it occupies when about to be forced by the pusher through the slot in the pocket aforesaid to carry with it the wrapper 2 into the gripper, it being observed that the wrapper is of a width over twice that of the tablet. Fig. 2 shows the position of the wrapper and tablet when in the embrace of the gripper, the wrapper having been folded partly over the upper face and completely over the underface of the tablet. Fig. 3 shows the wrapper in the position it assumes when being carried by the gripper over the face of the curved plate, the free end of the wrapper being thus folded up against the forward edge of the tablet while the remainder of the wrapper is upstanding. Fig. 4 shows the position of the wrapper on it having been carried down by the gripper on to the upstanding side tongues of the sloping delivery plate, the projecting under portions of the wrapper being thus folded up against the ends of the tablet. Fig. 5 shows the wrapper in the position it assumes at the commencement of the ejection of the tablet from the gripper onto the sloping surface, the side tongues on the gripper having tucked in the rear end folds 3 of the wrapper against the end surfaces of the tablet. At Fig. 6 the wrapper is shown as having been ejected from the gripper onto the sloping surface, passing against the side tongues on the sloping delivery plate and between the sloping surface and the brush by which the upstanding portion of the wrapper is swept down on to the upper surface of the tablet and the forward end folds 4 of the wrapper made against the end surfaces of the tablet. At Fig. 7 the wrapper is shown in the position it occupies after entering between the side blades of the delivery channel, the outstanding end flaps having been turned upwards against the ends of the tablet. At Fig. 8 one of the upstanding end flaps is shown as having been turned down upon the upper surface of the tablet, and at Fig. 9 the opposite upstanding end flap is shown as having been turned down upon the upper surface of the tablet over the first end flap. To produce this novel result in inclosing tablets in paper wrappers, the machine is constructed and operates as will now be described with reference to the accompanying drawings of the mechanism, whereon, Fig. 10 is a vertical cross section of the machine. Fig. 11 is a plan view, a portion of the table for carrying the wrapping material being broken away. Fig. 12 is an elevation showing the gripper and the entrance end of the delivery channel detached from the machine and drawn to a larger scale, illustrating also by dotted lines the gripper in the down position with the tablet upon the upstanding side tongues of the delivery plate; and Fig. 13 is a plan view of the said gripper and delivery plate, corresponding to the view shown at Fig. 12. Figs. 14 and and 15 are respectively a sectional elevation and a plan showing the delivery channel into which the tablets are forced and in which the end folds of the wrapper are completed.

Referring to the drawings of this machine—and particularly to Figs. 10 and 11—the table 5 is intended to receive a length of wrapping material, paper for instance, from a roll 6, the free end of which paper is passed over the surface of the table 5 between side guides 7, by which latter it is maintained in a straight line, and then forward between two rollers 8, 9, in contact. 10 is the main shaft which is carried in bearings in the framework of the machine, said shaft being driven direct by a belt pulley 11 (Fig. 11), and the rollers 8, 9 are intermittently driven from the shaft 10 through the medium of a pawl and ratchet mechanism 12 and spur gearing 13, 14 (Fig. 11), so operating the rollers to feed the paper through the necessary distance; and thus on the strip of paper being introduced between the rollers 8, 9 the intermittent motion causes the strip to be advanced a regulation distance into a vertical pocket 15. The walls of the pocket 15 are formed with a through slot for the passage of a knife 16 pivoted at 17 (Fig. 11) and operated at the proper time to cut off the strip of paper below the rollers 8, 9 by means of a connecting rod 18, pivoted to a two-armed lever 19 (Fig. 10) mounted on a fulcrum 20; and operated by a cam on the main shaft 10 of the machine. A table 21 is provided on the framework, over which travels a belt 22, driven by an endless band and pulley arrangement from the main shaft 10, to carry the tablets up to a stop 23 (Fig. 11). At the level of the upper surface of the table 21 there is a slot through the walls of the pocket 15, through which the tablet, resting against the stop 23, is to be forced, this being effected by a pusher 24 operated by a lever 25 actuated by a connecting rod 26 and a lever 27, rocking about a shaft 28, and actuated by a cam on the main shaft 10. Behind the walls of the pocket is located a gripper device, carried by a lever 29, fulcrumed on the shaft 28, and operated by a cam 30 on the main shaft 10, so that the gripper device is at one time located opposite the through slot in the pocket walls in position to receive the tablet forced through by the pusher, and at another time, when at its lowest point, occupies the position shown in dotted lines at Fig. 12, while at another time it rests directly opposite the delivery channel to allow the tablet to be ejected therefrom into the said channel.

The gripper device is specially illustrated at Figs. 12 and 13, and consists of a bottom plate 31, carried by the lever 29, having an upstanding flange 32 at its rear end, to which, at 33, is pivoted an upper plate 34, while the flange 32 is formed with a bearing to receive a sliding spring rod 35 whose forward end is fixed to an ejector bar 36, and this ejector bar is capable of being moved forwardly over the bottom plate, so as to eject, when necessary, the tablet which has been forced between the bottom and upper plates 31, 34. Beyond this, in order to carry out the present invention, the gripper has two projecting side tongues 37 which are carried by the ejector bar 36, these tongues 37 being shown especially at Fig. 12 in full lines and at Fig. 13 in dotted lines, the office of these tongues, as hereinafter more fully explained, being to give the rear end folds to the paper as shown at 3, Fig. 5.

It should now be understood that when the strip of paper has been advanced into the pocket 15 by the rollers 8, 9, and has been cut off just below the said rollers by the knife 16, the said tablet is forced through its slot at the level of the table 21 by the pusher 24, and the tablet in its motion carries with it the upper part of the wrapper (of paper) into and between the bottom and upper plates 31, 34 of the gripper, so folding the wrapper partly over the upper face and completely under the lower face of the tablet as well as around the forward edge of same, the tablet stopping short of the side tongues 37 on the ejector bar 36, thus placing the tablet and wrapper in the relative positions shown at Fig. 2 of the drawings, the unfolded part of the wrapper (Fig. 2) being still within the pocket 15. The gripper is then moved, by the mechanism previously described, from its position in full lines (Fig. 12) to its lowest position in dotted lines, the rearward edges of the bottom and upper plates of the gripper passing over the stationary curved surface plate 38 carried by the framework of the machine, and by this action the unfolded end of the wrapper (Fig. 2) is drawn out of the pocket 15 and folded over the rearward edge of the tablet, being brought into the position shown at Fig. 3 of the drawings: while the gripper on coming to its lowest position (shown by the dotted lines at Fig. 12) carries the projecting under portions of the wrapper onto upstanding side tongues 39 elastically attached by spring-studs 40 to a bracket 41 supporting the sloping delivery plate 42, by which the said projecting under portions of the wrapper are folded up against the ends of the tablet as shown at Fig. 4. The gripper, through the medium of its cam mechanism, now rises slightly so as to bring the tablet directly opposite the opening between the upper surface of the delivery plate 42 and the brush 43 located immediately over same, and while in this position is subjected to the action of an ejector lever 44 (Fig. 12) fulcrumed on the framework at 45 and operated by a link 46, a lever 47 rocking on the shaft 28, and operated at its free end by a cam on the main shaft 10.

The upper end of the ejector lever 44 is bifurcated, and when it receives a rearward motion, its forked ends strike the ends of the ejector bar 36, forcing the same rearwardly, causing the rod 35 to slide in its bearing and compressing the spring on the said rod, which action causes the projecting side tongues 37 of the ejector bar 36 to engage the rear projecting end portions of the wrapper and form the rear end folds 3 (Fig. 5), and also to carry the tablet forward with the forward projecting end portions of the wrapper against projecting side tongues 48 elastically attached by spring-studs 49 to the sides of the delivery plate 42, by which side tongues 48 the forward end folds 4 of the wrapper (Fig. 6) are produced. The rearward travel of the bar 36 also forces out the tablet into the passage between the delivery plate 42 and the brush 43, by which brush the upstanding flap (Fig. 5) is folded over onto the upper surface of the tablet as shown at Fig. 6, in which passage the folding operations are completed. The bottom plate 42 of this channel as shown at Figs. 10 to 15 is carried by the bracket 41 from the stationary framework, and to the sides of the plate 42, near the side tongues 48, are attached upstanding and inwardly turned blades 50, 51. As the tablet passes down the channel, these blades act upon the folded ends of the wrapper, as the tablet advances, the upstanding portions of the two blades 50, 51 first turning the said folded ends upwards against the ends of the tablet (Fig. 7); the inwardly turned portion of the blade 50 then turning down one end flap onto the upper surface of the tablet (Fig. 8), and the inwardly turned portion of the blade 51 subsequently turning down the other end flap onto the upper surface of the tablet, upon the other flap, as shown at Fig. 9, thus completing the wrapping of the tablet; the tablet is advanced down the passage by the pressure of other tablets which are forced into the channel in succession by the ejector mechanism of the gripper device.

52 is a stationary chute, up which the completely wrapped tablets are passed, one by one, as they come along the channel, by means of a tappet lever 53 pivoted at 54 to a stationary bracket 55, said lever 54 being operated at the required times by a link 56, a connecting rod 57 pivoted to the lower end of a lever 58 rocking on the shaft 28, and operated at its free end by a cam on the main shaft 10. In this way the completely wrapped tablets are built up, under each other in the chute 52 (see Fig. 15), and thus the wrappers are completely pressed upon their tablets, while the said chute is provided with spring clips 59 which hold up the tablets as they are passed upward by the tappet lever 53.

What I claim as my invention and desire to secure by Letters Patent is:—

1. In a machine for folding a wrapper around rectangular tablets, the combination with a pair of feed rollers adapted to feed forward a length or strip of wrapping material, a pocket adapted to receive the strip from the rollers, a knife adapted to sever or sub-divide the strip, a traveling belt adapted to feed forward the tablets, a stop against which the first tablets rests, a slot formed in the pocket, a pusher adapted to carry the delivered tablet through the slot in the pocket in a plane at right angles to the plane of the wrapper, a gripper device adapted to receive the tablet and its wrapper to fold the wrapper around the under-surface one edge and part of the upper surface of the tablet and then carry the partly wrapped tablet downwards, a stationary curved plate against which the forward edge of the gripper engages to turn upwards the projecting portion of the wrapper against the opposite edge of the tablet, an ejector bar on the gripper device, a sloping delivery plate onto which the partly wrapped tablet is passed, and a brush over the delivery plate to turn the upstanding portion of the wrapper down on to the tablet; of a pair of upstanding side tongues located on the forward end of the sloping delivery plate to fold up the projecting under portions of the wrapper against the ends of the tablet, means for forming the rear and forward end folds of the wrapper upon the tablet, means for turning the projecting folded ends of the wrapper upward against the ends of the tablet and then over upon the upper surface of the tablet, and means for completely pressing the wrapper upon the tablet, substantially as set forth.

2. In a machine for folding a wrapper around rectangular tablets, the combination with a pair of feed rollers adapted to feed forward a length or strip of wrapping material, a pocket adapted to receive the strip from the rollers, a knife adapted to sever or sub-divide the strip, a traveling belt adapted to feed forward the tablets, a stop against which the first tablet rests, a slot formed in the pocket, a pusher adapted to carry the delivered tablet through the slot in the pocket in a plane at right angles to the plane of the wrapper, a gripper device adapted to receive the tablet and its wrapper to fold the wrapper around the under-surface one edge and part of the upper surface of the tablet and then carry the partly wrapped tablet downwards, a stationary curved plate against which the forward edge of the gripper engages to turn upwards the projecting portion of the wrapper against the opposite edge of the tablet, an ejector bar on the gripper device, a sloping delivery plate onto which the partly wrapped tablet is passed, and a brush over the delivery plate to turn the upstanding portion of the wrapper down on to the tablet; of a pair of upstanding side tongues located on the forward end of the sloping delivery plate to fold up the projecting under portions of the wrapper against the ends of the tablet on the gripper device having carried the partly wrapped tablet downward below the curved plate, a pair of side tongues located on the ejector bar of the gripper device and a pair of side tongues located on the forward part of the sloping delivery plate to fold or tuck in the rear and forward projecting ends respectively of the wrapper upon the tablet on the latter being ejected from the gripper device onto the sloping delivery plate, means for turning the projecting folded ends of the wrapper upward against the ends of the tablet and then over upon the upper surface of the tablet, and means for completely pressing the wrapper upon the tablet, substantially as described.

3. In a machine for folding a wrapper around rectangular tablets, the combination with a pair of feed rollers adapted to feed forward a length or strip of wrapping material, a pocket adapted to receive the strip from the rollers, a knife adapted to sever or sub-divide the strip, a traveling belt adapted to feed forward the tablets, a stop against which the first tablet rests, a slot formed in the pocket, a pusher adapted to carry the delivered tablet through the slot in the pocket in a plane at right angles to the plane of the wrapper, a gripper device adapted to receive the tablet and its wrapper to fold the wrapper around the undersurface one edge and part of the upper surface of the tablet and then carry the partly wrapped tablet downwards, a stationary curved plate against which the forward edge of the gripper engages to turn upwards the projecting portion of the wrapper against the opposite edge of the tablet, an ejector bar on the gripper device, a sloping delivery plate onto which the partly wrapped tablet is passed, and a brush over the delivery plate to turn the upstanding portion of the wrapper down on to the tablet; of a pair of upstanding side tongues located on the forward end of the sloping delivery plate to fold up the projecting under portions of the wrapper against the ends of the tablet on the gripper device having carried the partly wrapped tablet downward below the curved plate, a pair of side tongues located on the ejector bar of the gripper device and a pair of side tongues located on the forward part of the sloping delivery plate to fold or tuck in the rear and forward projecting ends respectively of the wrapper upon the tablet on the latter being ejected from the gripper device onto the sloping delivery plate, a pair of upstanding and inwardly turned blades on the sloping delivery plate to turn the projecting folded ends of the wrapper upwards upon the ends of the tablet and subsequently to turn the upstanding folded ends of the wrapper over upon the upper surface of the tablet, and means for completely pressing the wrapper upon the tablet, substantially as described.

4. In a machine for folding a wrapper around rectangular tablets, the combination with a pair of feed rollers adapted to feed forward a length or strip of wrapping material, a pocket adapted to receive the strip from the rollers, a knife adapted to sever or sub-divide the strip, a traveling belt adapted to feed forward the tablets, a stop against which the first tablet rests, a slot formed in the pocket, a pusher adapted to carry the delivered tablet through the slot in the pocket in a plane at right angles to the plane of the wrapper, a gripper device adapted to receive the tablet and its wrapper to fold the wrapper around the undersurface one edge and part of the upper surface of the tablet and then carry the partly wrapped tablet downwards, a stationary curved plate against which the forward edge of the gripper engages to turn upwards the projecting portion of the wrapper against the opposite edge of the tablet, an ejector bar on the gripper device, a sloping delivery plate onto which the partly wrapped tablet is passed, and a brush over the delivery plate to turn the upstanding portion of the wrapper down on to the tablet; of a pair of upstanding side tongues projecting from the forward end of the sloping delivery plate to fold up the projecting under portions of the wrapper against the ends of the tablet on the gripper device having carried the partly wrapped tablet downward below the curved plate, a pair of side tongues located on the ejector bar of the gripper device and a pair of side tongues located on the forward part of the sloping delivery plate to fold or tuck in the rear and forward projecting ends respectively of the wrapper upon the tablet on the latter being ejected from the gripper device onto the sloping delivery plate, a pair of upstanding and inwardly turned blades on the sloping delivery plate to turn the projecting folded ends of the wrapper upwards upon the ends of the tablet and subsequently to turn the upstanding folded ends of the wrapper over upon the upper surface of the tablet, and a stationary chute located at the delivery end of the sloping plate up which the wrapped tablets are passed to completely press the wrappers upon the tablets, substantially as described.

In witness whereof I have hereunto set my hand in the presence of two witnesses.

FREDERICK GROVER.

Witnesses:
JOHN JOWETT,
VANCE E. GALLOWAY.